Oct. 20, 1925.  
W. B. WITKOWSKI  
1,557,953  
TAPPING MACHINE FOR STATIONARY OPEN HEARTH FURNACES  
Filed March 17, 1925  4 Sheets-Sheet 1

Witnesses  
C.E. Churchman Jr.  
W. E. Wright

Inventor  
W. B. Witkowski  
By Richard B. Owen,  
Attorney

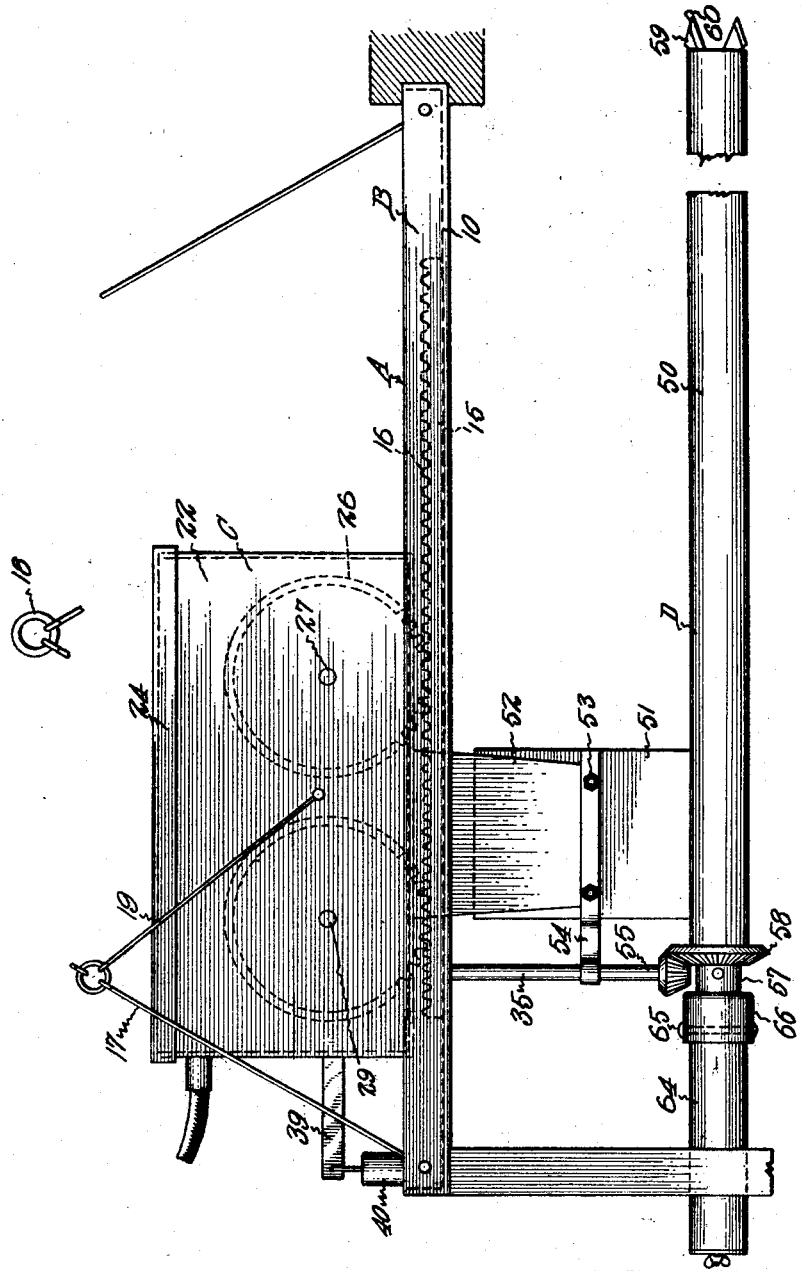

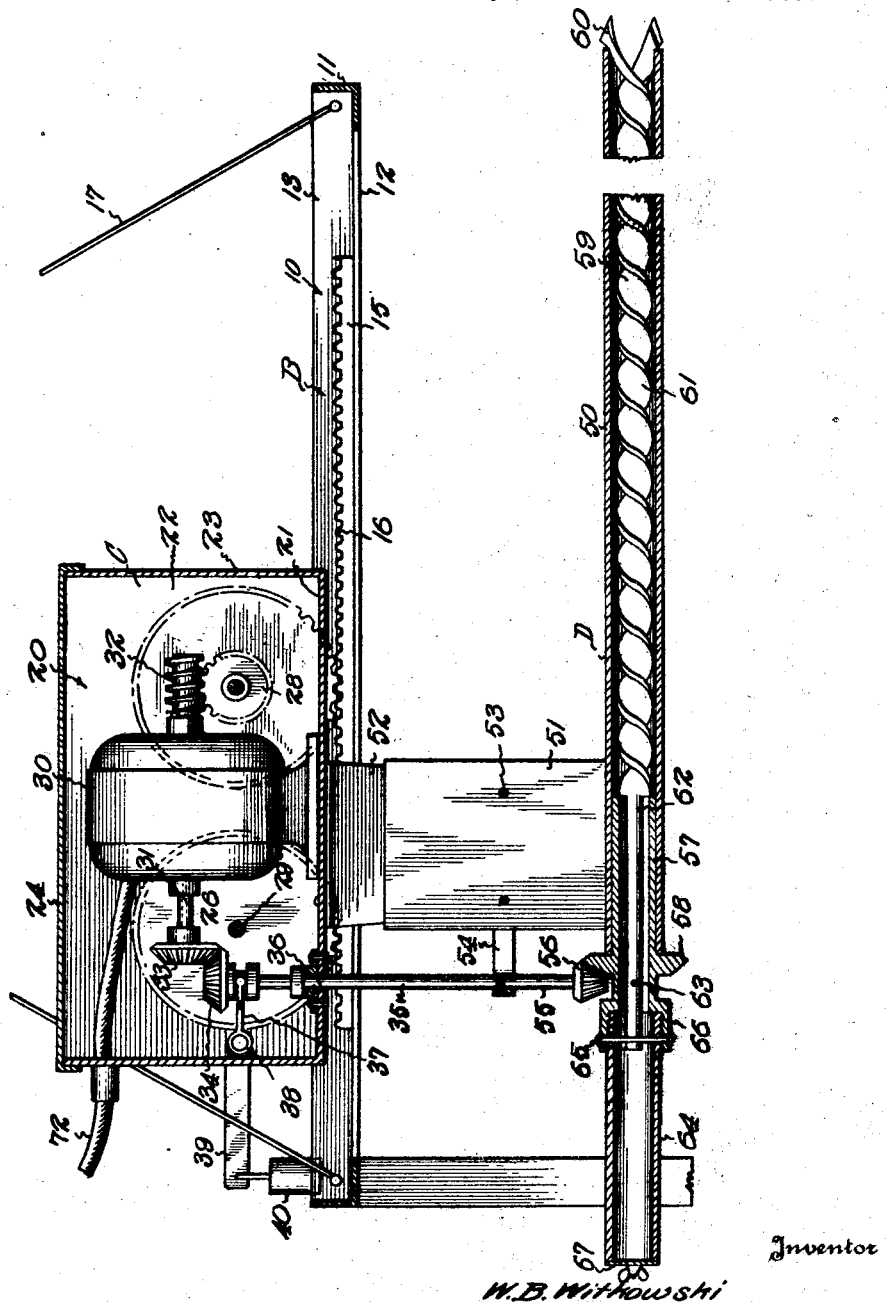

Oct. 20, 1925.
W. B. WITKOWSKI
1,557,953
TAPPING MACHINE FOR STATIONARY OPEN HEARTH FURNACES
Filed March 17, 1925      4 Sheets-Sheet 4
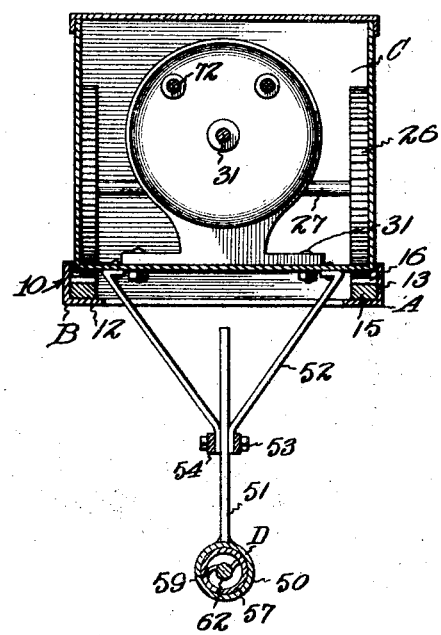
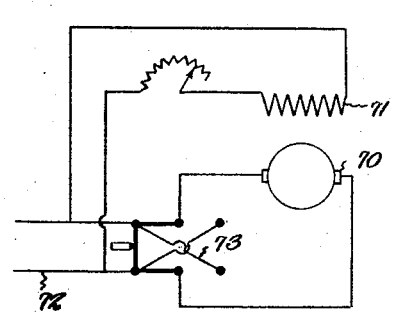
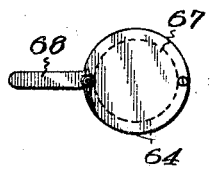

Patented Oct. 20, 1925.

UNITED STATES PATENT OFFICE.

WALTER B. WITKOWSKI, OF HAYS, PENNSYLVANIA.

TAPPING MACHINE FOR STATIONARY OPEN-HEARTH FURNACES.

Application filed March 17, 1925. Serial No. 16,244.

*To all whom it may concern:*

Be it known that I, WALTER B. WITKOWSKI, a citizen of the United States, residing at Hays, in the county of Allegheny and State of Pennsylvania, have invented certain new and useful Improvements in Tapping Machines for Stationary Open-Hearth Furnaces, of which the following is a specification.

This invention appertains to a novel drilling machine and more particularly to a novel device for removing the plug from the tapping holes of stationary open hearth furnaces.

The primary object of the invention is to provide a novel tapping machine for open hearth furnaces, which will entirely eliminate the danger heretobefore incident to the opening of the tap holes and which will open the holes in a minimum amount of time and with a minimum amount of effort.

Another object of the invention is the provision of novel means for automatically conveying the loam or clay from the holes as the same are being opened by the drill bit, and novel means for automatically feeding the bit into the holes.

A further object of the invention is the provision of a novel frame arranged in predetermined relation relative to the open hearth furnace, a carriage mounted for travelling movement on the frame, and means carried by and operated from the carriage for opening the holes, means being provided for simultaneously advancing the carriage and for rotating the drill.

A further object of this invention is the provision of novel means for reversing the carriage on the frame and for holding the bit against rotary movement during the rearward movement of the carriage.

A still further object of the invention is the provision of novel means for detachably connecting the drill and conveyor with the frame and carriage, whereby the said drill and conveyor can be quickly removed from the frame and carriage, when desirable or necessary.

A still further object of the invention is to provide an improved machine for opening tap holes in stationary open hearth furnaces of the above character, which will be durable and efficient in use, one that will be simple and easy to manufacture, and one which can be placed upon the market at a small cost.

With these and other objects in view, the invention consists in the novel construction, arrangement and formation of parts, as will be hereinafter, more specifically described, claimed, and illustrated in the accompanying drawings, in which drawings:

Figure 2 is a side elevation of the improved tapping machine,

Figure 3 is a longitudinal section through the improved machine,

Figure 4 is a transverse section through the machine illustrating the means for supporting the novel drill and conveyor from the travelling carriage, Figure 5 is an end elevation of the conveyor showing the case carried thereby, Figure 6 is a diagrammatic view illustrating the reversing switch connected with the driving motor.

Figure 1:
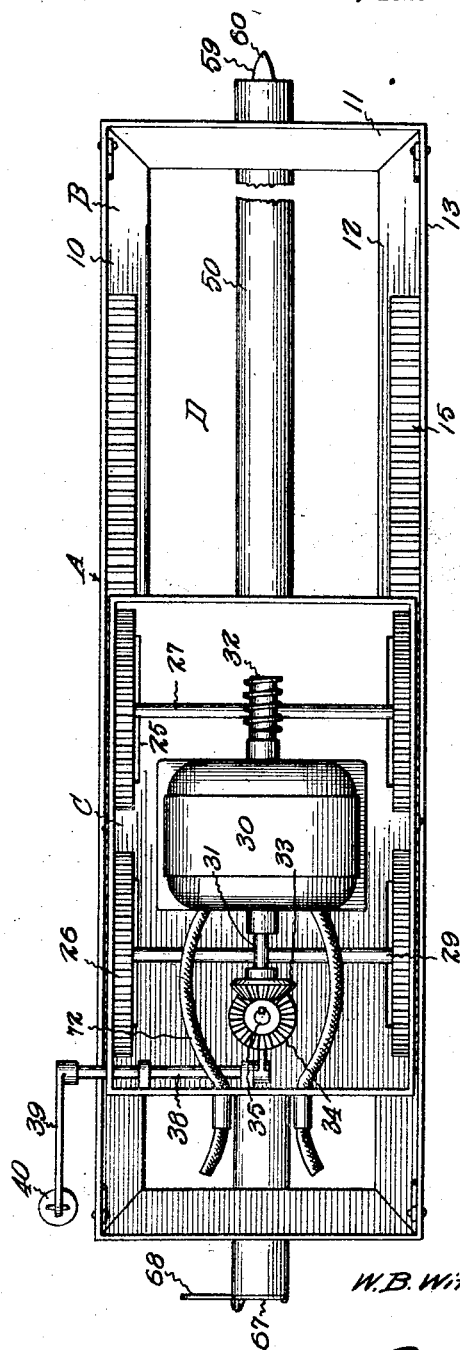
Figure 1 is a top plan view of the improved machine.

Referring to the drawings in detail, wherein similar reference characters designate corresponding parts throughout the several views, the letter A generally indicates the improved tapping machine which comprises the frame B; the travelling carriage C arranged on the frame and a bit and conveyor mechanism D operatively connected with the carriage.

The frame B is preferably of an open structure and formed from iron or steel of the desired gauge and embodies the longitudinally extending side rails 10 and the end rails 11, which are connected with the said side rails 10 in any desired way. The rails 10 and 11 are preferably constructed from angle iron and include horizontal flanges 12 and vertical guide flanges 13.

The horizontal flanges 12 of the side rails 10 are provided with longitudinally extending tracks 15 on which the carriage C is adapted to travel. The upper faces of the tracks 15 are provided with rack teeth 16, for a purpose, which will hereinafter more fully appear.

This frame B can be connected to the open hearth furnace directly above the tap hole, in any desired way such as by suitable clamps or the like, and if desired, the rear end of the frame can be supported by suitable legs. It is desired however, to support the frame B by the use of suitable hanger cables 17 which terminate in a supporting eye 18 that can be connected to a suitable crane, which will permit the raising and lowering of the entire machine and the quick moving of the machine above the tap hole, after the loam or clay has been removed therefrom. As shown one of the supporting cables 17 has connected thereto a relatively short cable 19, which leads to the travelling carriage C and thus prevents displacement of the carriage from off of the frame when the carriage is tilted to insure removal of all dirt, and the like from the conveyor.

The travelling carriage C comprises a casing 20 preferably formed from sheet metal and this casing includes a lower wall 21, side walls 22 and end walls 23. A removable cover 24 is also provided for the said casing. The bottom wall 21 of the casing or housing 20 is slotted as at 25 and pinions 26 operate through the slots and engage the teeth 16 on the tracks 15, for moving the carriage over the frame, when power is transmitted thereto. As shown the pinions 26 are arranged in front and rear pairs and the front pair of pinions are keyed or otherwise secured to a suitable supporting axle 27, the terminals of which are mounted in suitable bearings carried by the side walls 22 of the housing or casing 20. This axle 27 is provided with a worm wheel 28, for a purpose, which will hereinafter appear. The rear pair of pinions 26 can be mounted upon the rear axle 29, which also has its terminals mounted in suitable bearings carried by the side walls 22 of the said housing or casing.

Arranged within the housing or casing at the central portion thereof is a reversible electric motor 30 of the desired type and horse power. This motor is bolted or otherwise secured as at 31' to the bottom wall of the housing or casing 20, and the housing or casing 20 forms a protection therefor from the heat of the furnace. As stated the motor 30 is of the usual reversible type and embodies the armature shaft 31, the opposite ends of which extend beyond the casing of the motor 30. One end of the armature shaft 31 is provided with a worm 32 which meshes with the worm wheel 28, whereby the front pair of pinions can be rotated from the motor for advancing the carriage toward the furnace or away from the furnace, as the case may be. The rear end of the armature shaft 31 is provided with a beveled pinion 33, which meshes with a similar beveled pinion or gear 34 feathered upon a depending driven shaft 35. This shaft 35 is mounted in suitable bearings 36 carried by the lower wall of the housing or casing 20. As stated the beveled gear 34 is feathered upon the shaft 35 and can be raised or lowered into or out of meshing engagement with the gear pinion 33 by the means of a yoke 37, which is keyed or secured to a transverse shaft 38 mounted in bearings carried by one end wall 23 of the housing or casing. One end of this rock shaft 38 extends from out of the casing and has secured thereto a crank arm 39 on which is mounted a weight 40. As is obvious, the weight functions to normally hold the beveled gear 34 in a raised position in meshing engagement with the drive gear 33, so that the shaft 35 will be driven from the motor 30 at all times. This shaft 35 is utilized for driving the bit and conveyor D, as will now be described.

The tapping and conveying mechanism D comprises an elongated tubular casing 50 which extends longitudinally of and below the frame B. The upper end of the tubular casing 50 is provided with an upwardly extending fin 51 which is arranged between the depending supporting brackets 52 carried by the lower wall 21 of the housing 20. The fin 51 can be bolted to the depending brackets 52 by the use of suitable bolts or the like 53 and the brackets also preferably support rearwardly extending strap irons 54 for supporting the bearings for receiving the lower end of the drive shaft 35. Drive shaft 35 preferably carries a removable section 55 at its lower end, which can be connected thereto in any desired way. It is to be noted however, that the section 55 is removably connected with the main section 35 of the drive shaft at the point of connection with the fin 51 with the bracket 52. The extreme lower end of the section 55 of the drive shaft is provided with a beveled drive gear 56. The rear end of the hollow casing 50 supports a hollow shaft 57 and has formed thereon or secured thereto in any desired way the beveled drive gear which meshes with the beveled drive gear 56. Arranged within the tubular casing 50 is the drill bit 59 which embodies the cutting lips 60 which extend beyond the forward end of the said casing 50. The cutting lips 60 are formed on the forward end of the twisted body portion 61 of the bit, which operates within the tubular casing and forms a conveyor for directing the loam or clay cut from the tapping hole rearward. The extreme end of the bit is provided with the shank 62, which is keyed as at 63 or otherwise secured to the tublar shaft. It is to be noted that the bit shank 62 is spaced from the hollow shaft, whereby the material cut is permitted to flow through the hollow shaft into a sleeve 64 provided for that purpose. The sleeve 64 has its forward end secured in any desired way as at 65 to the large end 66 formed on the rear end of the said hollow shaft 57.

A pivoted gate 67 is provided at the rear end of the sleeve and this gate may be raised and lowered by means of a lever 68, which can be manually operated.

In Figure 6 of the drawing is shown a diagrammatic view of the motor which embodies the usual armature winding 70 and field 71. The feed wires 72 lead directly to the casing or housing 20 and a reversing switch 73 is incorporated in the said wires for the armature winding. As shown the wires for the field coils lead from the said wires 72.

In operation of the improved device, the frame B is placed in correct position relative to the furnace until the bit is in direct alinement with the tap hole. The switch 73 is now operated so that the shaft 31 of the motor will be operated in such a manner as to move the carriage C forwardly toward the furnace on the frame B and to rotate the said bit. It is obvious that as the bit cuts through the loam, clay or the like used to plug up the tapping hole, that the same will be advanced by the carriage C and the clay or loam, will be fed rearward through the casing 50 into the sleeve 64 by means of the twisted body 61 of the said bit.

As soon as the hole has been tapped, the switch 73 is reversed and the lever 39 is raised, so as to move the bevel gear 34 out of engagement with the bevel gear 33. The carriage 20 will be immediately fed rearward away from the furnace and the bit will be moved from the tapping hole. By operating the lever 39, it can be seen that the bit is held against rotation during the rearward movement of the said carriage. The frame B and parts carried thereby can now be swung to one side of the furnace if desired.

From the foregoing it can be seen that a novel and simple machine can be provided for effectively tapping, and quickly removing the clay from the tapping holes of stationary open hearth furnaces in a convenient and expeditious manner, without danger to the operator thereof.

In case the drill bit and casting 50 should be caught in a sudden spurt of the molten metal from the tap hole, it is obvious that the fin 51 can be readily disconnected from the brackets 52, the section 55 from the shaft 35 and new parts substituted therefor without a great outlay of money.

Changes in details may be made without departing from the spirit or scope of the invention, but:—

What I claim as new is:

1. A machine for tapping open hearth furnaces comprising a frame, means for supporting the frame relative to the furnace, and a carriage mounted on the frame for movement toward and away from the furnace, a bit associated with the carriage, and means located above the bit for rotating the bit during the advancing of the carriage toward the furnace.

2. A machine for tapping open hearth furnaces comprising a frame, means for supporting the frame relative to the furnace, a travelling carriage mounted upon the frame, a rotary bit associated with the carriage for movement therewith, and means arranged above the bit for simultaneously advancing the carriage toward the furnace and rotating said bit.

3. A machine for tapping open hearth furnaces comprising a frame arranged in a horizontal plane, tracks mounted upon the frame, a carriage disposed upon the tracks for movement toward and away from the furnace, depending brackets carried by the carriage, a hollow casting arranged below the frame and connected with the brackets, a rotatable bit arranged in the hollow casing, and means arranged within the carriage for operating the carriage on said track and for rotating said bit.

4. A tapping machine for open hearth furnaces comprising a stationary frame, a carriage mounted upon the frame for movement toward and away from the furnace embodying a protecting housing, a motor in the housing, means operated from the motor for advancing the carriage on said frame, a longitudinally extending bit arranged below the frame and means for operating the bit from said motor.

5. A tapping machine for stationary open hearth furnaces comprising a supporting frame, including longitudinally extending side rails, longitudinally extending tracks secured to the rails provided with rack teeth, a carriage arranged on the frame embodying a protecting housing, axles rotatably supported on the housing, pinions connected with the axle engaging the rack teeth of the tracks, a motor disposed within the housing, means for operating one of the axles from said motor, a tubular casing arranged below and longitudinally of the frame, and a drill bit carried by said tubular casing, means for driving the bit from said motor, and means for reversing the motor.

6. A tapping machine for stationary open hearth furnaces comprising a frame embodying longitudinally extending side rails, tracks arranged upon said side rails, and a carriage arranged for travelling movement on the frame embodying a protecting housing including a lower wall having slots therein, axles carried by the housing, pinions secured to the axles operating through the slots engaging the tracks, a reversible electric motor arranged in the housing between said axles, means for driving one of said axles from the motor, a depending drive shaft rotatably carried by the housing, means for operating the drive shaft from said motor, a tubular casing arranged below and longitudinally of the frame, and a rotatable bit carried by the tubular casing and means for operating the bit from said drive shaft, and means for connecting the drive shaft from the motor.

7. In a tapping machine for open hearth furnaces, a frame, a travelling carriage carried by the frame, a depending longitudinally extending tubular casing detachably connected with the carriage, a drill bit rotatably carried by the tubular casing, and a depending drive shaft operated from the carriage and depending therefrom, and a shaft section rotatably carried by the tubular casing operatively connected with the drill bit and detachably connected with said drive shaft.

8. In a furnace tapping machine, a frame, a carriage reciprocally mounted upon the frame, a motor for operating the carriage, and a longitudinally extending tubular casing rigidly connected with the carriage and arranged below the frame, a tubular drill bit rotatably arranged within the casing including a twisted body, cutting lip and a shank, a hollow shaft rotatably carried by the tubular casing driven from the carriage receiving said shank, a sleeve connected with the hollow shaft, and a swinging gate connected with the rear end of said sleeve.

In testimony whereof I affix my signature.

WALTER B. WITKOWSKI.